United States Patent [19]

Minchak et al.

[11] Patent Number: 4,522,902
[45] Date of Patent: Jun. 11, 1985

[54] POLYMERIC BATTERY SEPARATORS

[75] Inventors: Robert J. Minchak, Parma Heights; William N. Schenk, Peninsula, both of Ohio

[73] Assignee: The B. F. Goodrich Company, Akron, Ohio

[21] Appl. No.: 609,941

[22] Filed: May 14, 1984

[51] Int. Cl.$^3$ .............................................. H01M 2/16
[52] U.S. Cl. .................................... 429/252; 429/254
[58] Field of Search ............... 429/247, 249, 251, 252, 429/253, 254

[56] References Cited

U.S. PATENT DOCUMENTS 4,224,393 9/1980 Feinberg et al. .................... 429/251
4,331,746 5/1982 Sheibley ............................. 429/251

FOREIGN PATENT DOCUMENTS 2042013 9/1980 United Kingdom ................ 429/251

Primary Examiner—Donald L. Walton
Attorney, Agent, or Firm—J. Hughes Powell, Jr.; Alan A. Csontos

[57] ABSTRACT

Configurations of cross-linked or vulcanized amphophilic or quaternized block copolymer of haloalkyl epoxides and hydroxyl terminated alkadiene polymers are useful as battery separators in both primary and secondary batteries, particularly nickel-zinc batteries. The quaternized block copolymers are prepared by polymerizing a haloalkyl epoxide in the presence of a hydroxyl terminated 1,3-alkadiene to form a block copolymer that is then reacted with an amine to form the quaternized or amphophilic block copolymer that is then cured or cross-linked with sulfur, polyamines, metal oxides, organic peroxides and the like.

19 Claims, No Drawings

POLYMERIC BATTERY SEPARATORS

BACKGROUND OF THE INVENTION

Both primary, lead-acid, and secondary, nickel-zinc for example, batteries contain separators. The primary function of the separator is to keep the positive and negative cell components apart, preventing electronic shorts but not inhibiting ionic transport in the cell. In both applications the separators must be chemically and mechanically stable, and have long life expectancy, the requirement being more stringent in secondary batteries.

In nickel-zinc batteries, the cycle life is related to a substantial degree to separator properties, and the literature reports that batteries made with separators having low electrolytic resistivity have the longest life cycle. In these batteries the separators must have good physical and chemical stability including resistance to concentrated alkali. Types of separators used by those skilled in the art include fibrous and membrane separators, the first type being represented by non-woven polypropylene and nylon webs, and asbestos mats or inorganic filled polymeric non-woven materials. Permeable membranes include porous sheet separators as polyethylene, Dynel, polypropylene and the like. Semipermeable separators are represented by cellulose films, modified methylcellulose, cellophane and the like. Synthetic membranes include polyethylene grafted membranes and ion exchange membranes. A synthetic polymeric membrane separator is described in U.S. Pat. No. 3,629,161, prepared by first making 6,6-Ionene by reacting N,N,N',N'-tetramethylhexanediamine with 1,6-dibromohexane, dissolving polyvinyl alcohol in water, reacting tetrachloro-o-benzoquinone and the 6,6-Ionene, reacting, and casting films from the reaction product. Improved polymeric membranes are a continual objective, especially for use in secondary battery applications.

SUMMARY OF THE INVENTION

Configurations of cross-linked or vulcanized amphophilic or quaternized film forming block copolymers of haloalkyl epoxides and hydroxyl terminated alkadiene polymers are useful as battery separators in both primary and secondary batteries, particularly nickel-zinc batteries. The quaternized block copolymers are prepared by polymerizing a haloalkyl epoxide in the presence of a hydroxyl terminated 1,3-alkadiene to form a block copolymer that is then reacted with an amine to form the quaternized or amphophilic block copolymer that is then cured or cross-linked with sulfur, polyamines, metal oxides, organic peroxides and the like.

DETAILED DESCRIPTION

The discharge cycle life of nickel-zinc batteries is related in part to the transport properties of the battery separators. These properties include electrolytic resistivity, electrolyte permeability and electroosmotic coefficient. Of these, electrolytic resistivity of the polymeric separator is very important. Electrolytic resistivity is determined as described in, J. E. Cooper and A. Fleischer, "*Characteristics of Separators for Alkaline Silver Oxide, Zinc Secondary Batteries—Screening Methods,*" AF Aero Propulsion Laboratory, September, 1965. Determination of electroosmotic coefficients is described by K. W. Choi, D. N. Bennion and J. Newman, J. Electrochemical Society, 123, 1616 (1976). Separators are preferred that minimize osmotic forces and electrolytic concentration gradients. Membrane battery separators having the lowest electrolytic resistivity and electroosmotic coefficient, and the highest electrolyte permeability are those that provide the longest battery cycle life. Membranes of cured amphophilic or cationic block copolymers of this invention have an excellent balance of these desirable characteristics for use as battery separators, better than known polymeric membranes.

The electroosmotic coefficient of membranes should be less than −0.1, more preferably from about −0.2 to −1.0, as −0.25 to −0.85. The electrolytic resistivity should be less than about 100 ohm/cm, preferably in the range of about 10 to 50 ohm/cm. Cured membranes prepared in accordance with the invention have electroosmotic coefficient of less than about −0.25, and electrolytic resistivity less than about 100 ohm/cm.

In addition to the basic requirements described above for polymeric materials used in battery separators, the polymers also must be film formable and resistant to 30–50% aqueous solutions of potassium hydroxide. Films as thin as 20 mils or less, must be flexible, have mechanical and dimensional stability, i.e., exhibit minimum swelling in the aqueous electrolyte, and be cross-linkable by uncomplex methods.

The quaternized block copolymers used to make the battery separators of this invention are prepared by polymerizing a haloalkyl epoxide in the presence of a hydroxyl terminated 1,3-diene polymer to provide a block copolymer of residues of the haloalkyl epoxidehydroxyl terminated 1,3-diene-haloalkyl epoxide, reacted with an amine to form the quaternized material.

The copolymers are formed by the action of hexafluormetallic acid catalysts, or oxonium salt thereof, on the ring openable haloalkyl epoxide and hydroxyl terminated 1,3-diene, normally in a solvent, at a temperature of about 0° C. to about less than 150° C., at ambient or elevated pressure.

The catalysts are hexafluorometallic acids, HMF$_6$, wherein M is an element selected from the group consisting of phosphorus, arsenic and antimony; the acids being HPF$_6$, HAsF$_6$, and HSbF$_6$; and oxonium salts of these acids. The catalyst is used in an amount sufficient to initiate the polymerization. It is preferred to use a cyclic or acyclic oxonium salt which may be primary, secondary or tertiary. The cyclic oxonium salt may be prepared by reaction of an acyclic oxonium salt with tetrahydrofuran. It is most preferred to use a trialkyloxonium or other oxonium salt of the HMF$_6$ acid prepared as described in U.S. Pat. No. 3,585,227. The amount of the catalyst used is from about 0.001 part to about 1 part per 100 parts by weight of reactants.

The haloalkyl epoxides have the general structure

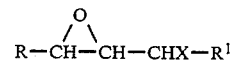

wherein X is a halogen atom, preferably chlorine or bromine, and R and R$^1$ are hydrogen or an alkyl radical containing 1 to 8, preferably 1 to 4 carbon atoms. Typical haloalkyl epoxides that may be employed include for example, chloro-2,3-epoxypropane (epichlorohydrin); 1-bromo-2,3-epoxypropane (epibromohydrin); 1-chloro-2,3-epoxybutane; 1-iodo-2,3-epoxyhexane; 3-chloro-4,5-epoxyoctane; 1-chloro-2,3-epoxycyclohexane; 1-bromo-2,3-epoxy-3-methylbutane; 2-chloro-2-methyl-3,4-epoxypentane; and the like, containing from 3 to about 8 carbon atoms.

The hydroxyl terminated 1,3-dienes are normally hydroxyl terminated polymers of conjugated aliphatic dienes containing 4 to 6 carbon atoms, usually 1,3-butadiene and isoprene, either as the homopolymers or as copolymers containing more than about 50 weight percent conjugated diene and less than 50 weight percent of one or more copolymerizable vinylidene compounds monomers having at least one terminal $CH_2<$ grouping. 1,3-Butadiene polymers are more readily prepared and available, and those having molecular weights in the range of about 375 to about 15,000 have been found to be satisfactory.

Typical vinylidene comonomers for copolymerizing with the conjugated 1,3-diene include, for example, vinyl aromatics such as styrene, α-methyl styrene, chlorostyrene, vinyl toluene, vinyl benzyl alcohol, and the like; vinyl and allyl ethers of alkyl radicals containing 1 to 8 carbon atoms such as vinyl methyl ether, allyl methyl ether, and the like; acrylic acids and acrylates having the formula

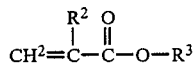

wherein $R^2$ is hydrogen or an alkyl or hydroxyalkyl radical containing 1 to 3 carbon atoms, and $R^3$ is hydrogen or an alkyl or hydroxylalkyl radical containing 1 to 22 carbon atoms, or an alkoxyalkyl, alkylthioalkyl, or cyanoalkyl radical containing 2 to 12 carbon atoms, more preferably 2 to 8 carbon atoms. Examples of suitable acrylates include ethyl acrylate, butyl acrylate, hexyl acrylate, 2-ethylhexyl acrylate, methyl methacrylate, ethyl methacrylate, octyl methacrylate, hexylthioethyl acrylate, β-cyanoethyl acrylate, cyanooctyl acrylate, and the like; vinyl nitriles, including acrylonitrile, methacrylonitrile and ethacrylonitrile; amides of α,β-olefinically unsaturated carboxylic acids containing 2 to 8 carbon atoms, preferably acrylamide or methacrylamide and methylol derivatives thereof as N-methylol acrylamide and methacrylamide; N-vinyl-2-pyrrolidone; vinyl esters such as vinyl acetate, vinyl maleate, vinyl fumarate; vinyl and vinylidene halides as vinyl chloride and vinylidene chloride; acrolein and methacrolein, methallyl chloride; itaconic acid, vinyl and allyl esters of carboxylic acids containing 2 to 8 carbon atoms, including vinyl chloroacetate, allyl chloroacetate, vinyl crotonate; vinyl ethyl furmarate; vinyl cyclohexene; nitrostyrene; alkoxy monomers as methoxystyrene; chloroprene; vinyl naphthalene; vinyl piperidine; vinyl pyridine; N-vinyl pyrrolidine; vinyl stearate, vinyl sulfanilic acid; methyl vinyl sulfone; chloroethyl vinyl ether, vinyl benzychloride; β-chloroethyl vinyl phosphonate, diacetone acrylamide, and the like.

A group of preferred comonomers are styrene, acrylonitrile, methacrylonitrile, alkyl acrylates and alkacrylates wherein the alkyl groups contain 1 to 8 carbon atoms.

The temperature employed in polymerizing the haloalkyl epoxide with the hydroxyl terminated 1,3-diene polymer is usually between about 0° C. and 110° C. The polymerization reaction is exothermic and the reaction temperature is readily maintained by the controlled rate of catalyst addition, and suitable heat exchange means. The time of the polymerization reaction will normally vary from about 1 to about 12 hours but in some cases will take up to about 24 hours or more, depending on the particular catalyst used, the amount used, the temperature, and other factors.

The polymerization process may be carried out at autogenous pressures, although superatmospheric pressures of up to 10 atmospheres or more may be employed.

On completion of the polymerization reaction, the reaction may be terminated by neutralizing the catalyst by adding a molar excess of a base such as ammonium hydroxide in isopropanol. Unreacted monomer, if any, may be removed by evaporation under vacuum.

The polymers formed by the process described will vary from liquids, to semisolids, to solids, and the weight average molecular weight of such polymers will vary from greater than 1000 to about 500,000, more preferably about 3500 to 20,000. Molecular weights are preferably determined by gel permeation chromatography (GPC) using a Waters Model 200 instrument equipped with a modified Waters R4 differential refractometer detector. The solvent used is tetrahydrofuran and flow rate is 2.0 mm$^3$/min, in a column 25·cm by 7.8 mm ID, packed with Waters Microstyragel. The theoretical molecular weight of the hydroxyl terminated epoxide block copolymer is calculated by the following equation:

$$Mn = ([A]/[B] \times \text{mol wt of } A + \text{mol wt of } B) \times \frac{\% \text{ conv.}}{100}.$$

The structure of the block copolymers is simply, A—B—A, wherein "B" is derived from the hydroxyl terminated conjugated 1,3-diene polymer, and "A" represents residues of the haloalkyl epoxide. More specifically, the polymer may be represented as H—O—A$_b$—O—B—O—A$_b$—O—H wherein B is the residue of the hydroxyl terminated conjugated diene-1,3 polymer, A is the residue of the haloalkyl epoxide, and b is an integer from about 3 to about 500, more preferably about 5 to about 50. The molecular weight of the B segment is from about 350 to about 15,000 or higher, preferably about 500 to about 5,000. The molecular weights of the A segments is from about 350 to about 10,000, more preferably from about 500 to about 2500.

The quaternized block copolymer may be represented by the following structure when A is derived from epichlorohydrin

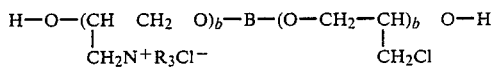

wherein b is an integer from about 5 to about 100. And there is at least about 25 weight percent of the epichlorohydrin pendant groups as —CH$_2$N$^+$R$_3$Cl$^-$ group, i.e., alkyl ammonium chloride groups, wherein R is hydrogen or an organic radical containing 1 to 30 carbon atoms. As a general guide, the larger the molecular weight of the epichlorohydrin portion of the copolymer the lower the percent of quaternized groups required for film integrity.

The block copolymers are quaternized or aminated by reaction of active chlorine groups on the block copolymer molecule chain (haloalkyl epoxide residues) with amines under elevated temperature and pressure. Amination or quaternization is effected in bulk by using an an excess of amine, or in solution using a predetermined stoichiometric amount of the amine, usually a slight excess over the amount calculated as being necessary to effect the desired degree of amination or quaternization. A solvent, such as dimethyl formamide, acetonitrile, an aliphatic ketone having from 2 to about 20 carbon atoms, particularly acetone, or even water, and the like may be used to obtain a solution, though obtaining such a solution may not be necessary. Aprotic solvents are useful. The amination reaction is carried out in the range from about 40° C. to about 150° C., as 50° C. to 120° C., and autogenous pressure.

Any amine may be used for the amination reaction. Preferred amines are selected from the group consisting of: alkylamines, dialkylamines, and trialkylamines having from 1 to about 30 carbon atoms; and more preferably alkylamines of from 1 to about 6 carbon atoms; cyclic alkylamines having from 5 to about 7 carbon atoms, more preferably cyclohexylamine; fatty amines having from 10 to about 50 carbon atoms; polymeric amines and polyetheramines having a molecular weight in the range from about 100 to about 500; alkanolamines having from 1 to about 30 carbon atoms, and more preferably from 1 to about 6 carbon atoms; morpholine; pyridine; aniline; thiazine, and the like. Preferred are the tertiary monoamines as aliphatic, heterocyclic, aromatic, or alicyclic monoamines. The monofunctional tertiary aliphatic amines have the formula NRRR' wherein R is methyl or ethyl and R' is the same as R or is a hydroxyethyl radical. Examples of these are trimethyl amine, triethyl amine, dimethylethyl amine, dimethyl hydroxyethyl amine, and the like. Examples of the saturated heterocyclic monoamines are N-methyl piperidine, N-ethyl piperidine, N-methyl hexamethyleneamine, N-methyl pyrrolidine, N-methylmorpholine, and the like. Examples of monofunctional unsaturated heterocyclic amines are pyridine, 4-methylpicoline, quinoline, N-methyl pyrrole, and the like. Examples of alicyclic tertiary amines are N,N-dimethyl cyclohexylamine and the like, and aromatic monoamines such as N,N-dimethyl aniline, N,N-diethyl aniline, and the like. The more preferred tertiary amines are the aliphatic tertiary monoamines and saturated heterocyclic tertiary monoamines.

As to the degree of amination of the reactive chlorine groups, it is preferred that at least 25 weight percent to 80 weight percent to the aminated or quaternary form of the chlorine groups are converted, more preferably about 45 to 70 weight percent.

In the aminated block copolymer, part of the reactive halogens are typically replaced with an alkylammonium halide group formed from the amine used to aminate or quaternize the block copolymer, the halide being the displaced polymer halogen.

The polymeric materials of this invention may be used in a variety of configurations in battery applications. Normally the separators will be used as unsupported or supported films. The membrane films will be less than about 20 mils in thickness, down to about 1 mil unsupported. In supported applications, as on porous supports for example, the film may be as thin as 0.01 mil, more normally about 0.02 and thicker. It is preferable that the thinnest film consistent with acceptable mechanical stability, resistance to shock, stress and tearing and the like, be used for minimum electrolytic resistivity of the separator.

The films may be formed by conventional methods as from solutions, calendared, and the like. Since some of the membrane materials with the most desirable properties are tacky and weak in an uncured state, the films may be deposited from solution containing the required curing or cross-linking ingredients added thereto. However, materials of higher molecular weight, such that they can be handled on mills and the like, may be calendared, extruded, etc. to form the desired membrane in film form.

The quaternized block copolymer membranes are vulcanized or cross-linked with a variety of curing or vulcanizing agents. Useful curing agents include, sulfur and sulfur containing compounds; organic peroxides and hydroperoxides such as benzoyl peroxide and dicumyl hydroperoxide; metal oxides such as zinc oxide, lead oxide, magnesium oxide, calcium hydroxide, and the like; polyamines including primary, secondary and tertiary amines, normally diamines including, hexamethylene triamine, piperazine, triethylene tetramine, phenylene diamine, toluene-2,4-diamine, 4,4'-methylenedianiline, hexylmetheylenediamine, isophorene diamine, bis(4-aminocyclohexyl)methane, and the like. Particularly useful are cures employing zinc oxide in combination with sulfur, optionally with sulfur containing accelerators, and zinc oxide in combination with organic peroxides. Any of the well known sulfur containing accelerators may be used. Typical accelerator materials include N-t-butyl-2-benzothiazolesulfenamide, dipentamethylene thiuram hexasulfide, sodium dibutyldithiocarbamate, tetramethyl thiuram disulfide, 2-mercaptobenzothiazole, bis(2,2'-benzothiazolyl)disulfide, thiocarbamyl sulfeneamide, and the like.

Other compounding ingredients may be used to enhance the processing or physical properties of the cured amphophilic block copolymers. Such materials include fatty acids as stearic acid, stabilizers and antioxidants, both amine and phenol types such as phenyl-B-naphthylamine, hindered bisphenols, alkyl phenyl phosphites and the like. Extenders, fillers and reinforcing materials may be included as needed for particular applications. Such materials include carbon blacks, calcium carbonate, inorganic silicates as clays, silica, mica, magnesium carbonate, and the like in amounts from about 5 to 150 weights parts per 100 weight parts of block copolymer.

Membranes of the amphophilic block copolymers are prepared in several ways. One method is to add the desired curing and compounding ingredients to a solution of the block copolymer, casting a film of the compound, drying and curing the cast film with heat. In some instances, after adding the curing and other ingredients to the polymer solution, the solvent is first removed, the polymer is then milled or otherwise processed before forming into the desired configuration and cured. Similarly, particularly with higher molecular weight block copolymers, a solvent free polymer is compounded on a mill or in an internal mixer, and then formed as desired and heated to effect curing or crosslinking.

A typical procedure for curing with sulfur involves mixing 100 weight parts of solvent free quaternized block copolymer, or the polymer in solution, with 2 weight parts of sulfur, 2 weight parts of N-t-butyl-2-benzothiazolesulfenamide and 5 weight parts of zinc oxide. This mixture is formed into sheets and placed in a press under 40,000 psi at 180° C. The cure time will vary, but usually is about 20 to 40 minutes. Another method that may be used is to add to a solution of the quaternized block copolymer, 5 to 10 weight parts of piperazine or triethylene tetramine per 100 weight parts of block copolymer. A film is deposited from the solution using a Gardner blade, the solvent is evaporated, and the film is heated at 100° C. for about 1 to 2 hours to complete the vulcanization or cross-linking.

A typical block copolymer is prepared by reacting 250 weight parts of hydroxyl terminated poly(butadiene-1,3), having a molecular weight of 2500, with 100 weight parts of epichlorohydrin in the presence of 0.4 weight part of triethyloxonium hexafluorophosphate in 5 parts of ethylene dichloride at 30° C. overnight, to yield a block copolymer having a molecular weight of about 3500. The structure may be written as polyepichlorohydrin (500 mol. wt.)-poly(butadiene-1,3) (2500 mol. wt.)-polyepichlorohydrin (mol. wt. 500). When the example is repeated with 740 weight parts of epichlorohydrin, the resulting block copolymer obtained had terminal epichlorohydrin residue segments having molecular weights of about 3700 respectively. A variety of block copolymers may be made in this manner by using polybutadienes having molecular weights of 500 to about 5000, and epichlorohydrin residue segments of 350 to about 5000 or more. Following these procedures, block copolymers polyisoprene and copolymers of butadiene and isoprene are also readily prepared. Such copolymers typically contain about 15 to about 40 weight percent of comonomers as styrene, alkyl acrylates, acrylonitrile, and the like.

To demonstrate quaternization or amination of the block copolymers, 400 weight parts of the second copolymer described above was dissolved in 400 weight parts of acetone, 800 weight parts of water was added, then 196 grams of trimethylamine, along with 4 weight parts of 2,2'-methylene-bis(4-methyl-6-t-butylphenol) antioxidant. The solution was heated to 100° C. for about 8 hours. 73 weight percent of the chlorine groups in the epichlorohydrin residues in the block copolymer were aminated to form the alkylammonium chloride groups.

EXAMPLE 1

The polymer used in this Example was the reaction product of epichlorohydrin-hydroxyl terminated polybutadiene-1,3-epichlorohydrin, and the average molecular weight for the block copolymer, A—B—A, was about 500-2500-500. The copolymer was quaternized with trimethyl amine in amount so that about 50 percent of the chlorine groups reacted with the amine. The polymer was compounded with 2 weight parts of sulfur, 2 weight parts of N-t-butyl-2-benzothiazolesulfenamide, 5 weight parts of zinc oxide, per 100 weight parts of block polymer; by adding to 20.4 weight parts of a toluene solution of the copolymer containing 55 percent polymer, 0.2 weight parts of sulfur, 0.2 weight parts of the N-t-butyl-2-benzothiazolesulfenamide, 0.5 weight part of zinc oxide and 100 ml of a 2/1 mixture of methyl alcohol and toluene. The solvent was evaporated under vacuum at 80° C., and the dried compound was milled and cured in a press at 160° C., using a Teflon coated 0.05 inch mold under 10,000 Kg pressure. Another sample was prepared using 0.4 weight part stearic acid in addition to other compounding ingredients listed above.

1 gram samples of each of these vulcanized films were placed in a container of 45 weight percent potassium hydroxide in water heated to 80° C., with air bubbling through the KOH solution. The samples were exposed to these conditions for 4 days. Thereafter, the samples were removed, washed with distilled water to remove the KOH, and dried in a vacuum oven to constant weight. Both samples showed a maximum weight loss of only 2.7 weight percent. Commercial applications require less than 4 weight percent loss in KOH under these test conditions.

EXAMPLE 2

A block copolymer of epichlorohydrin-hydroxyl terminated polybutadiene-1,3-epichlorohydrin, molecular weight 500-2500-500, 56% quaternized with trimethylamine, in a 50 percent solution in toluene, was compounded with 0.5 weight part of finely divided silica, 0.5 weight part of zinc oxide, 0.2 weight part of sulfur, 0.2 weight part of N-t-butyl-benzothiazolesulfenamide, per 10 weight parts of copolymer, along with 70 ml of a 1/1 mixture of methanol and toluene. The compounded mixture was slowly air dried and the dry compound heated at 40° C. under vacuum. The compound was then milled and pressed at 180° C. under 15,000 Kg pressure for 10 minutes in a Telfon coated 0.05 inch mold. The film was tested for stress-strain properties using the Instron following ASTM D-412. The data obtained are in Table 1 and show the good physical properties of the film.

TABLE I

Dumbbell Samples Jaw Speed = 20.0 in/min
Stress in lb/in and SI units in Mega Pascals

| Sample | 1 | 2 | 3 | 4 | Average | SI |
|---|---|---|---|---|---|---|
| Thickness/Inches | 0.040 | 0.039 | 0.040 | 0.040 | | |
| Rate/Min Strn | 13.71+ | 13.08 | 12.98 | 12.99 | 13.02 | 13.02 |
| Elong/Break/% | 146 | 130 | 121 | 138 | 133 | 133 |
| Stress | | | | | | |
| 10 | 65 | 77 | 67 | 68 | 69 | 0.48 |
| 20 | 105 | 113 | 105 | 110 | 108 | 0.74 |
| 30 | 131 | 142 | 130 | 140 | 136 | 0.94 |
| 40 | 155 | 164 | 153 | 161 | 158 | 1.09 |
| 50 | 172 | 183 | 174 | 180 | 177 | 1.22 |
| 100 | 235 | 255 | 242 | 249 | 245 | 1.69 |
| At Break | 296 | 300 | 267 | 306 | 292 | 2.01 |
| Corrected Stress | | | | | | |
| 10 | 71 | 85 | 73 | 75 | 76 | 0.52 |
| 20 | 126 | 136 | 126 | 132 | 130 | 0.89 |
| 30 | 171 | 185 | 169 | 182 | 177 | 1.22 |
| 40 | 217 | 230 | 215 | 225 | 222 | 1.53 |
| 50 | 259 | 275 | 261 | 270 | 266 | 1.83 |
| 100 | 470 | 511 | 485 | 499 | 491 | 3.38 |
| At Break | 729 | 691 | 590 | 729 | 685 | 4.72 |

EXAMPLE 3

A solution of the block copolymer of Example 2 dissolved in toluene to form a 50% solution was compounded with 5 weight parts of titanium dioxide, 0.2 weight part of sulfur and 0.2 weight part of zinc oxide per 10 weight parts of polymer. 100 ml of a 1/1 mix of methyl alcohol and toluene was added and the mixture air dried slowly. The dried compound was milled and cured as described in Example 2. The stress-strain properties of the cured films were determined in accordance with ASTM Test Method D-412. The stress-strain data will be found in Table II. An other compound was prepared with 10 weight parts of titanium dioxide (100 weight parts/100 weight parts of polymer) rather than 5 used above. The sample was processed and cured as described. The stress-strain data on this cured polymer are found in Table III.

TABLE II

Dumbbell Samples Jaw Speed = 20.0 in/min
Stress in lb/in and SI units in Mega Pascals

| Sample | 1 | 2 | 3 | 4 | 5 | Average | SI |
|---|---|---|---|---|---|---|---|
| Thickness/Inches | 0.041 | 0.041 | 0.041 | 0.040 | 0.042 | | |
| Rate/Min Strn | 12.48 | 12.28 | 11.96 | 12.62 | 12.29 | 12.32 | 12.32 |
| Elong/Break/% | 191 | 204 | 183 | 201 | 163 | 194 | 194 |
| Stress | | | | | | | |
| 10 | 56 | 70 | 61 | 66 | 76 | 66 | 0.45 |
| 20 | 79 | 90 | 91 | 89 | 92 | 91 | 0.62 |
| 30 | 97 | 106 | 106 | 103 | 103 | 105 | 0.72 |
| 40 | 106 | 114 | 121 | 114 | 112 | 112 | 0.77 |
| 50 | 116 | 123 | 123 | 122 | 124 | 123 | 0.84 |
| 100 | 148 | 153 | 158 | 166 | 160 | 157 | 1.08 |
| 200 | 0 | 192 | 0 | 198 | 0 | 195 | 1.54 |
| At Break | 189 | 193 | 202 | 198 | 181 | 193 | 1.33 |
| Corrected Stress | | | | | | | |
| 10 | 62 | 77 | 67 | 73 | 83 | 72 | 0.50 |
| 20 | 195 | 108 | 109 | 107 | 111 | 109 | 0.75 |
| 30 | 126 | 138 | 139 | 134 | 134 | 136 | 0.94 |
| 40 | 149 | 159 | 170 | 160 | 157 | 159 | 1.10 |
| 50 | 174 | 184 | 184 | 183 | 186 | 184 | 1.27 |
| 100 | 297 | 307 | 316 | 332 | 320 | 314 | 2.17 |
| 200 | 0 | 578 | 0 | 594 | 0 | 586 | 4.04 |
| At Break | 550 | 588 | 574 | 598 | 477 | 577 | 3.98 |

TABLE III

Dumbbell Samples Jaw Speed = 20.0 in/min
Stress in lb/in and SI units in Mega Pascals

| Samples | 1 | 2 | 3 | 4 | Average | SI |
|---|---|---|---|---|---|---|
| Thickness/Inches | 0.042 | 0.042 | 0.042 | 0.042 | | |
| Rate/Min Strn | 12.83 | 11.80 | 14.14 | 12.85 | 12.90 | 12.90 |
| Elong/Break/% | 188 | 149 | 150 | 137 | 156 | 156 |
| Stress | | | | | | |
| 10 | 86 | 106 | 86 | 98 | 94 | 0.65 |
| 20 | 124 | 129 | 119 | 126 | 124 | 0.86 |
| 30 | 141 | 150 | 137 | 148 | 144 | 0.99 |
| 40 | 161 | 159 | 155 | 168 | 161 | 1.11 |
| 50 | 171 | 173 | 160 | 181 | 171 | 1.18 |
| 100 | 218 | 214 | 205 | 223 | 215 | 1.48 |
| At Break | 268 | 257 | 246 | 247 | 255 | 1.75 |
| Corrected Stress | | | | | | |
| 10 | 95 | 116 | 94 | 108 | 103 | 0.71 |
| 20 | 148 | 155 | 143 | 152 | 149 | 1.03 |
| 30 | 184 | 195 | 178 | 192 | 187 | 1.29 |
| 40 | 226 | 223 | 217 | 235 | 225 | 1.55 |
| 50 | 256 | 260 | 240 | 271 | 257 | 1.77 |
| 100 | 436 | 429 | 410 | 447 | 431 | 2.97 |
| At Break | 773 | 642 | 616 | 587 | 654 | 4.51 |

EXAMPLE 4

In this Example, a block copolymer of hydroxyl terminated butadiene-1,3 and epichlorohydrin, having a molecular weight average of A—B—A of 770-2800-770, quaternized with trimethylamine to 50% quaternization of the chlorine atoms, and having a calculated charge density of 1.74 milliequivalents, was compounded with 2 weight parts of sulfur, 2 weight parts of N-t-butyl-2-benzothiazolesulfenamide, 5 weight parts of zinc oxide per 100 weight parts of block copolymer. Samples of this compound were pressed at 40,000 psi at 180° C. for 30 minutes to form a membrane of about 3 mils thickness. While this membrane swelled some on contact with water, it retained satisfactory mechanical properties, including tear resistance.

Another block copolymer was prepared and tested for water resistance. This copolymer was prepared from hydroxyl terminated polybutadiene-1,3 and epichlorohydrin and had a molecular weight, A—B—A, for 4400-2800-4400. The copolymer was reacted with trimethylamine to a degree of quaternization of only 35%, and had a calculated charge density of 2.47 meq/g. When this polymer was cured with the same sulfur cure of the first sample described above and exposed to water, the membrane swelled excessively, was easily torn, and was unsatisfactory.

We claim:

1. Battery separators comprising cross-linked block copolymers of haloalkyl epoxides and hydroxyl terminated alkadiene polymers, said block copolymers having the formula H-O-$A_b$-O-B-O-$A_b$-O-H wherein A represents residues of the haloalkyl epoxides, b is an integer of at least 3, B represents residues of the hydroxyl terminated alkadiene polymers, and at least 25 weight percent of the halogen atoms on the haloalkyl epoxide residues are in the form of alkylammonium halides of the formula $-N^+R_3X^-$ wherein X is the halogen atom and R is hydrogen or radicals containing 1 to 30 carbon atoms.

2. Battery separators of claim 1 wherein the haloalkyl epoxide is epichlorohydrin, the hydroxyl terminated alkadiene polymer is a hydroxyl terminated butadiene-1,3 polymer and the formula is

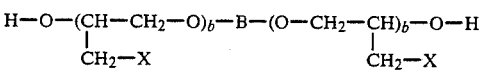

wherein X is chlorine or alkyl ammonium chloride groups of the formula $-N^+R_3Cl^-$, at least 25 weight percent of the chlorine atoms being present in the $-N^+R_3Cl^-$ groups wherein R contains 1 to 8 carbon atoms and b is about 5 to 100.

3. Battery separators of claim 2 wherein the molecular weight range of B is about 500 to about 10,000.

4. Battery separators of claim 3 wherein B is a butadiene-1,3 homopolymer, the molecular weight range is from about 1500 to about 5000, b is about 5 to about 25, and R represents alkyl groups containing 1 to 6 carbon atoms.

5. Battery separators of claim 3 wherein B is a hydroxyl terminated copolymer of butadiene-1,3 containing at least 50 weight percent butadiene-1,3 and less than 50 weight percent of at least one copolymerizable vinylidene monomer having at least one terminal $CH_2<$ group, having a molecular weight from about 1500 to about 5000, b is about 5 to 25 and R represents alkyl groups containing 1 to 6 carbon atoms.

6. Battery separators of claim 5 wherein the vinylidene comonomers are selected from the group consisting of styrene, acrylonitrile and alkyl acrylates and methacrylates wherein the alkyl groups contain 1 to 8 carbon atoms.

7. Battery separators of claim 4 wherein at least 50 weight percent of the chlorine atoms of the epichlorohydrin are present in $-N^+R_3Cl^-$ groups.

8. Battery separators of claim 1 in the form of films having thicknesses from about 0.01 to about 20 mils.

9. Battery separators of claim 2 in the form of films having thicknesses from about 0.01 to about 20 mils.

10. Battery separators of claim 3 in the form of films having thicknesses from about 0.01 to about 20 mils.

11. Battery separators of claim 4 in the form of films having thicknesses from about 0.01 to about 20 mils.

12. Battery separators of claim 5 in the form of films having thicknesses from about 0.01 to about 20 mils.

13. Battery separators of claim 7 in the form of films having thicknesses from about 0.01 to about 20 mils.

14. Battery separators of claim 1 cross-linked by vulcanizing amounts of at least one of sulfur and sulfur containing compounds, metal oxides, polyamines and organic peroxides.

15. Battery separators of claim 14 wherein the metal oxide is zinc oxide.

16. Battery separators of claim 15 wherein both sulfur and zinc oxide are present.

17. Battery separators of claim 14 containing inorganic fillers.

18. Battery separators of claim 17 wherein said filler is finely divided silica in amounts from 2.5 to 100 weight parts of silica per 100 weight parts of block copolymer cross-linked with zinc oxide and sulfur.

19. Battery separators of claim 18 cross-linked by vulcanizing amounts of sulfur, sulfur containing accelerators, and zinc oxide.

* * * * *